(12) United States Patent
Ueyama et al.

(10) Patent No.: US 10,926,706 B2
(45) Date of Patent: Feb. 23, 2021

(54) TONNEAU COVER FOR VEHICLE

(71) Applicant: HONDA MOTOR CO., LTD., Tokyo (JP)

(72) Inventors: Tasuku Ueyama, Wako (JP); Ryuya Kawata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 64 days.

(21) Appl. No.: 16/335,369

(22) PCT Filed: Aug. 9, 2017

(86) PCT No.: PCT/JP2017/029017
§ 371 (c)(1),
(2) Date: Mar. 21, 2019

(87) PCT Pub. No.: WO2018/055942
PCT Pub. Date: Mar. 29, 2018

(65) Prior Publication Data
US 2019/0283678 A1  Sep. 19, 2019

(30) Foreign Application Priority Data

Sep. 23, 2016 (JP) .............................. JP2016-186007

(51) Int. Cl.
*B60R 5/04* (2006.01)
*B60R 11/00* (2006.01)

(52) U.S. Cl.
CPC ................ *B60R 5/047* (2013.01); *B60R 5/04* (2013.01); *B60R 2011/008* (2013.01)

(58) Field of Classification Search
CPC ...... B60R 5/047; B60R 5/04; B60R 2011/008
(Continued)

(56) References Cited

U.S. PATENT DOCUMENTS 5,213,387 A     5/1993 Decker et al.
5,547,187 A *   8/1996 Spykerman ............. B60R 5/045
                                                    296/37.16
(Continued)

FOREIGN PATENT DOCUMENTS

DE     102010022681 A1    1/2011
DE     102015205771 B3    7/2016
(Continued)

OTHER PUBLICATIONS

International Search Report by ISA/JP dated Sep. 5, 2017, on PCT/JP2017/029017 (4 pages).
(Continued)

*Primary Examiner* — Pinel E Romain
(74) *Attorney, Agent, or Firm* — Rankin, Hill & Clark LLP

(57) ABSTRACT

Provided is a tonneau cover for vehicles, with which convenience can be improved. A tonneau cover for vehicles, provided with: a flexible sheet-shaped cover body; a winding device for winding the cover body while one end of the cover body is supported; and a handle means disposed at the other end of the cover body, the handle means serving as a handle when the cover body is drawn out from the winding device, wherein the winding device is configured so as to be detachably mounted on either of a pair of wall parts disposed so as to face each other as wall surfaces constituting a luggage compartment of a vehicle, and the handle means is disengageably interlocked to the other wall part facing the one of the wall parts on which the winding device is affixed.

4 Claims, 7 Drawing Sheets

(58) Field of Classification Search
USPC .......................................................... 296/98
See application file for complete search history.

(56) References Cited

U.S. PATENT DOCUMENTS 5,947,358 A * 9/1999 Wieczorek .............. B60R 5/047
  224/539
9,238,438 B1 * 1/2016 Valencia Cruz ........ B60R 5/045

FOREIGN PATENT DOCUMENTS

| EP | 0776787 A2 * | 6/1997 | ............. B60R 5/047 |
| JP | H06-1182 A | 1/1994 | |
| JP | H08-2331 A | 1/1996 | |
| JP | H09-207676 A | 8/1997 | |
| JP | 2006-137307 A | 6/2006 | |
| JP | 2016-507420 A | 3/2016 | |
| WO | 2014127820 A1 | 8/2014 | |

OTHER PUBLICATIONS

Written Opinion by ISA/JP dated Sep. 5, 2017, on PCT/JP2017/029017 (3 pages).
Extended European Search Report dated May 31, 2019 (6 pages).

* cited by examiner

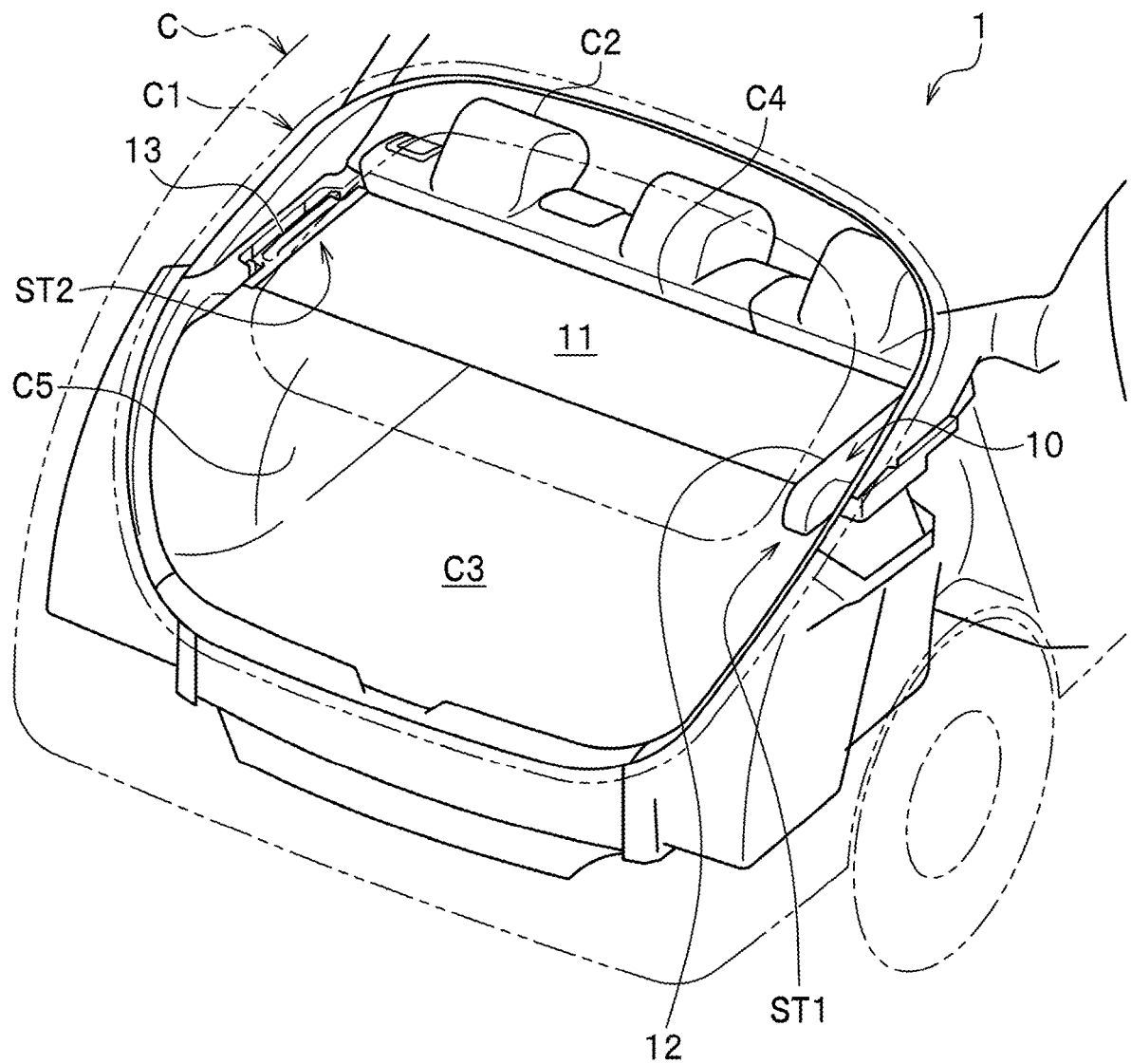
FIG. 1
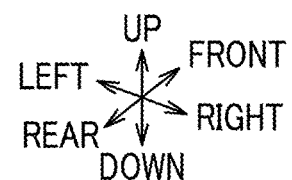

TONNEAU COVER FOR VEHICLE

TECHNICAL FIELD

The present invention relates to a tonneau cover for a vehicle which covers a luggage compartment and improves the appearance of the vehicle from the outside.

BACKGROUND ART

A vehicle such as a station wagon or a minivan has been conventionally mounted with a tonneau cover for a vehicle configured to conceal a luggage compartment to improve the appearance of an interior of a vehicle cabin from the outside of the vehicle.

For example, in the case of a tonneau cover for a vehicle configured such that a roll-up unit extending in a vehicle width direction is arranged on a back surface of a backrest of a rearmost seat and a cover body is spread out toward the vehicle rear side, when the backrest of the rearmost seat is folded to increase the luggage compartment, the roll-up unit remains as an obstacle.

Accordingly, Patent Literature 1 proposes a configuration in which the roll-up unit constituting the tonneau cover for the vehicle is arranged to extend along one vehicle cabin side wall and a cloth-like cover body is spread out in a vehicle width direction and hooked to the other vehicle cabin side wall opposite to the one side wall.

In such a configuration, the roll-up unit does not remain as an obstacle when the backrest of the rearmost seat is folded. Moreover, spreading and roll-up of the cover body can be performed from the rearmost seat.

CITATION LIST

Patent Literature

Patent Literature 1: Japanese Patent Application Publication No. Hei 6-1182

SUMMARY OF INVENTION

Technical Problem

In the tonneau cover for the vehicle in Patent Literature 1, since the roll-up unit is fixed to the one vehicle cabin side wall, the roll-up unit narrows the width of the luggage compartment and does not allow luggage to be loaded over the entire luggage compartment. Moreover, this tonneau cover has problems that the roll-up unit gets in the way of loading and unloading of luggage and the direction in which the cover body is spread is limited.

The present invention has been made in view of the aforementioned points and an object thereof is to provide a tonneau cover for a vehicle which can be improved in convenience.

Solution to Problem

In order to achieve the aforementioned object, the present invention provides a tonneau cover for a vehicle including: a sheet-like flexible cover body; a roll-up device configured to roll up the cover body while supporting one end of the cover body; and handle unit arranged at another end of the cover body and configured to serve as a handle when the cover body is pulled out from the roll-up device, the tonneau cover for a vehicle characterized in that the roll-up device is configured to be detachably attachable to either of paired wall portions arranged opposite to each other as wall surfaces forming a luggage compartment of the vehicle, and the handle unit is capable of being locked to and unlocked from one of the wall portions opposite to the other wall portion to which the roll-up device is attached.

Advantageous Effects of Invention

According to the present invention, it is possible to provide a tonneau cover for a vehicle which can be improved in convenience.

BRIEF DESCRIPTION OF DRAWINGS

FIG. 1 is a rear perspective view illustrating a vehicle body in which a tonneau cover for a vehicle according to an embodiment is installed.

DESCRIPTION OF EMBODIMENTS

Figure 2:
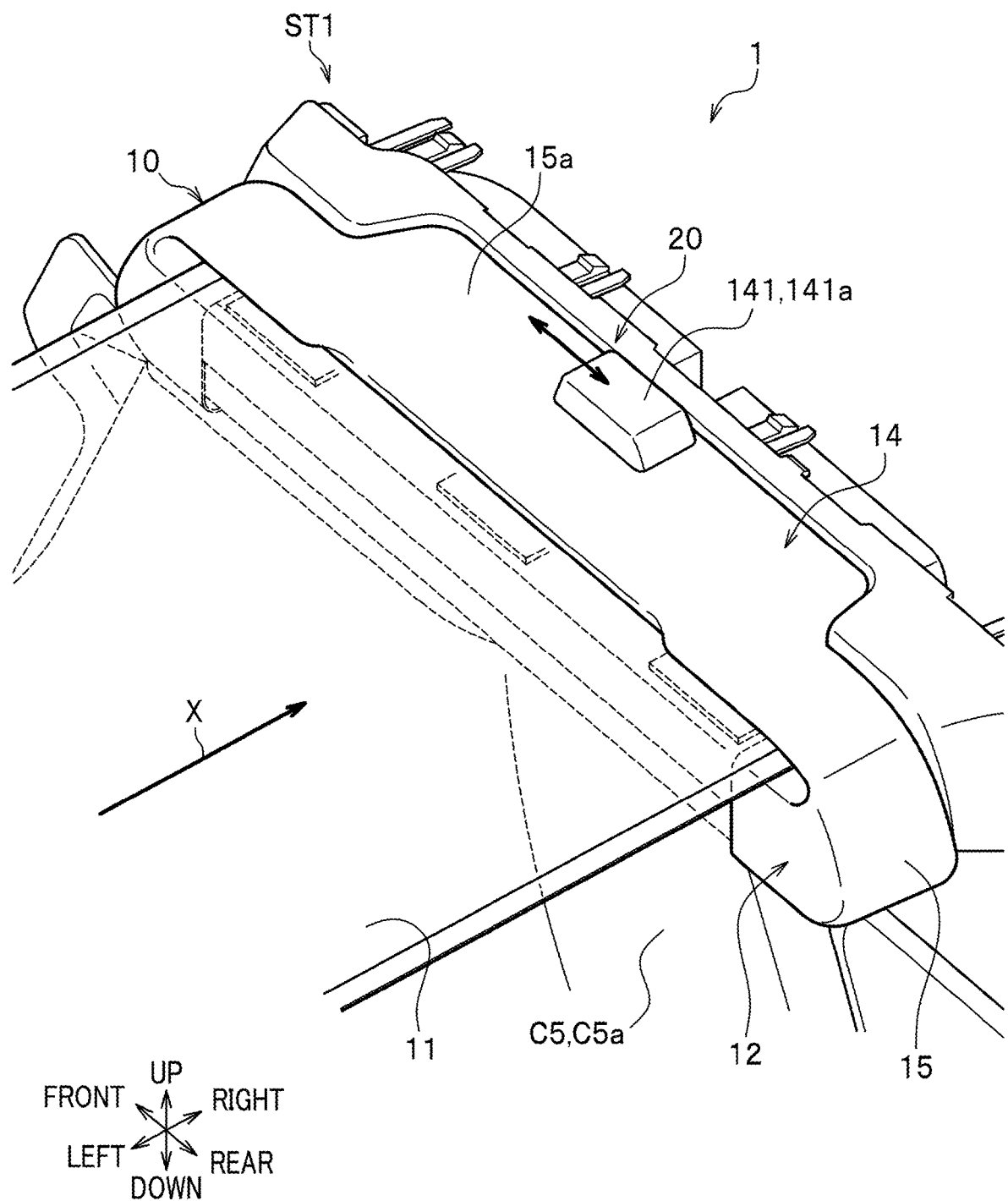
FIG. 2 is a perspective view of a device main body illustrated in a state attached to a wall portion of the vehicle body.

An embodiment of the present invention is described in detail with reference to the drawings as necessary. The same components are denoted by the same reference numerals and overlapping description is omitted.

First, description is given of a vehicle C in which a tonneau cover 1 for a vehicle in the embodiment is installed.

As illustrated in FIG. 1, the vehicle C has a vehicle body style like a wagon, a minivan, or the like in which a vehicle cabin can be accessed from the vehicle rear side by opening and closing a tailgate C1. Moreover, in the vehicle C, a luggage compartment C3 is defined behind a rearmost seat C2 which is a seat located behind all other seats in the vehicle cabin.

The luggage compartment C3 is sectioned and defined on four sides by a backrest C4 of the rearmost seat C2 and a tail gate C1 in a front-rear direction and by left and right side walls C5.

The tonneau cover 1 for the vehicle covers luggage when the luggage is loaded on the aforementioned luggage compartment C3 and thereby improves the appearance when the inside of the vehicle is viewed from the tailgate C1 or the like.

As illustrated in FIG. 1, the tonneau cover 1 for the vehicle in the embodiment includes a device main body 10, an attachment structure ST1, and a lock structure ST2.

The device main body 10 is detachably attached to the vehicle body via the attachment structure ST1. As illustrated in FIGS. 1 and 2, the device main body 10 includes a cover body 11, a roll-up device 12, handle unit 13, and main body-side attachment unit 14.

Note that the main body-side attachment unit 14 and the roll-up device 12 are housed in a main body case 15. The main body-side attachment unit 14 and the roll-up device 12 can be thereby handled as one unit.

The cover body 11 is formed of a sheet-like member flexible enough to be rolled up like a cloth. Moreover, the cover body 11 is rolled up in a state where a base end portion of the cover body 11 in a roll-up direction X is supported by the roll-up device 12 and the cover body 11 can be freely pulled out from the inside of the roll-up device 12. The handle unit 13 is arranged in a distal end portion of the cover body 11 in the roll-up direction X.

As is well known, in the roll-up device 12, the base end portion of the cover body 11 is supported by a roll-up rod (not illustrated) rotatably supported on the main body case 15. The roll-up device 12 rolls up the cover body 11 around the roll-up rod to house it by biasing the roll-up rod in the roll-up direction X.

Figure 3:
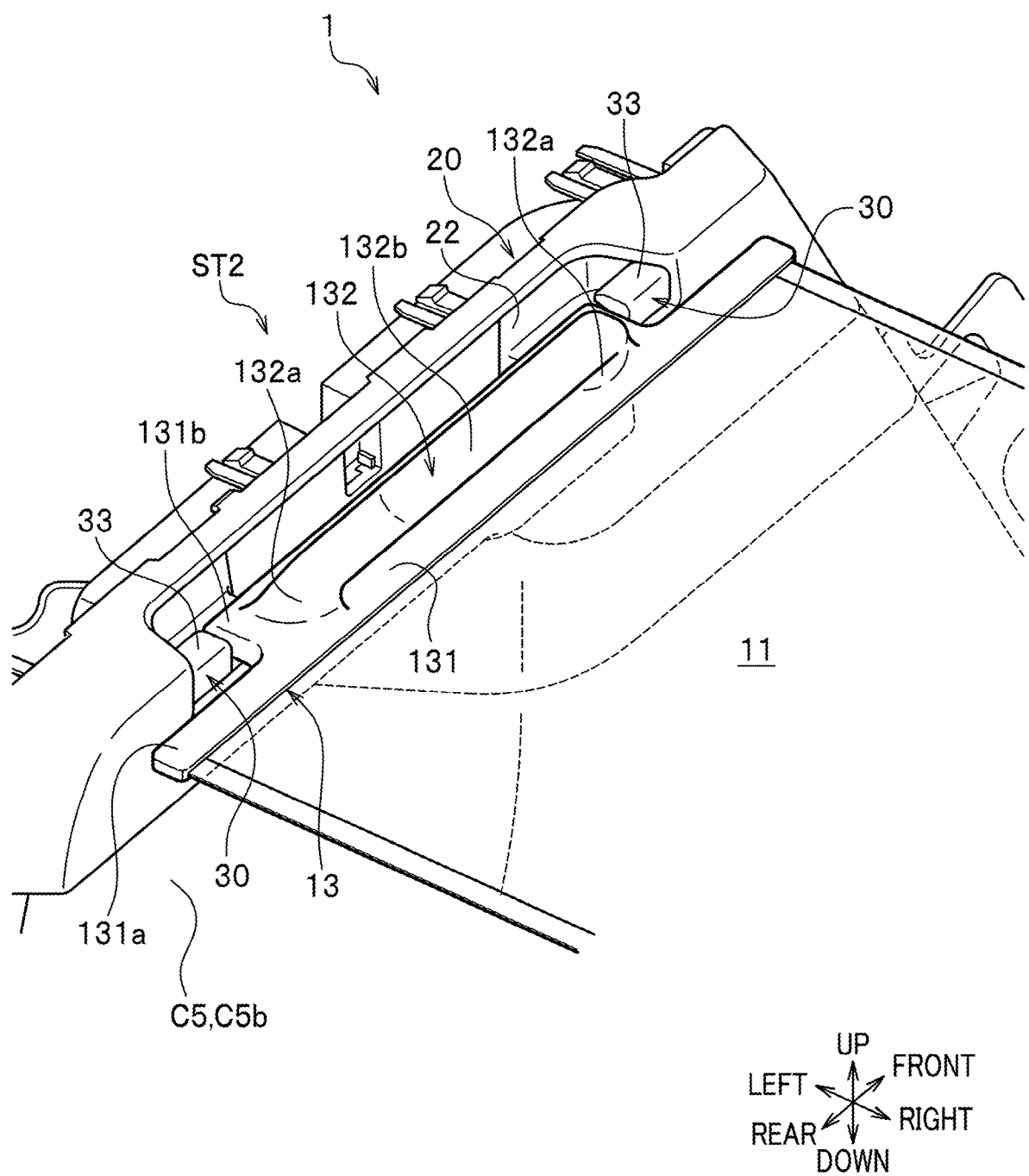
FIG. 3 is a perspective view of handle unit illustrated in a state locked to a wall portion of the vehicle body.
Figure 4:
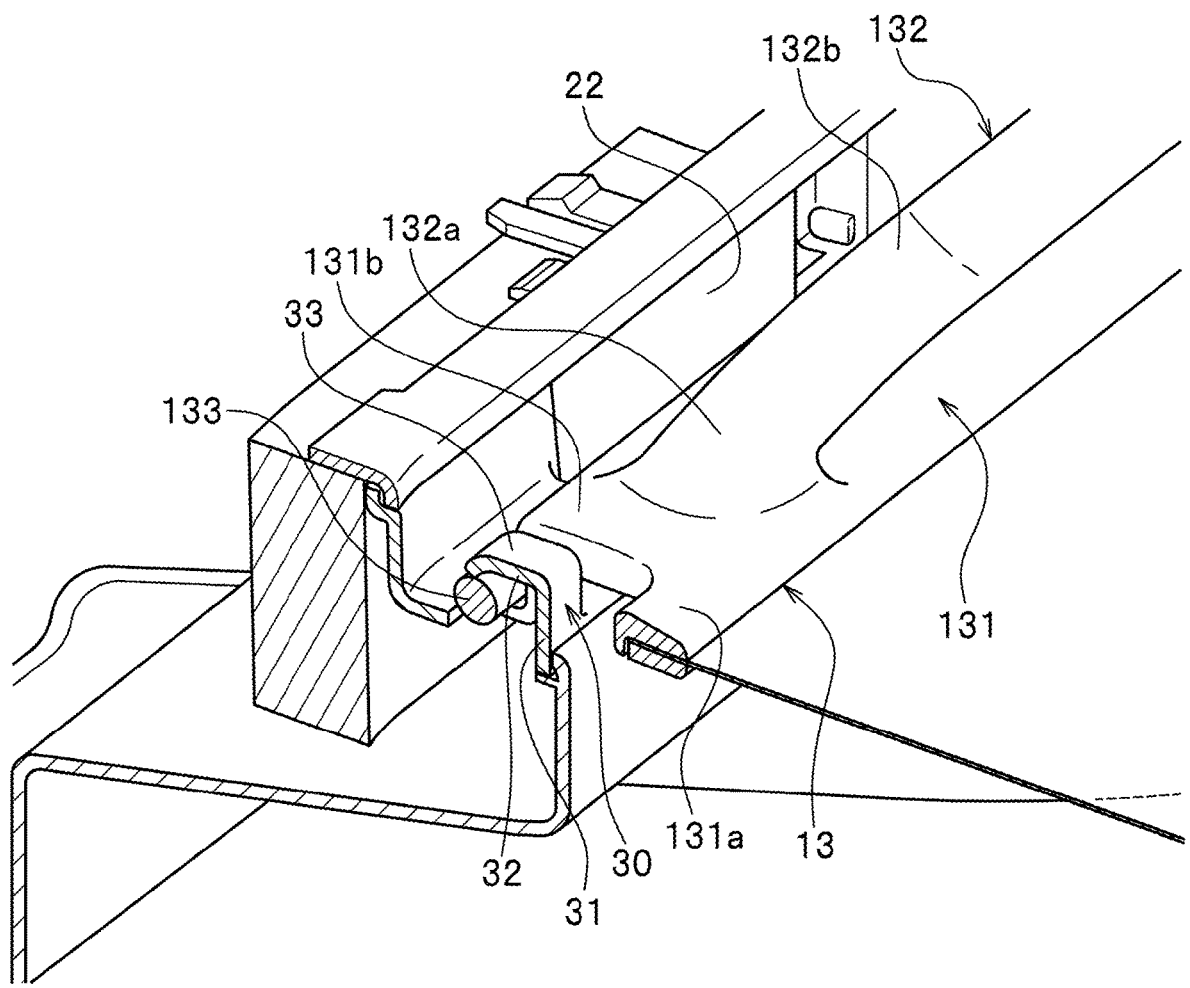
FIG. 4 is a cross-sectional perspective view of a main portion illustrating a configuration of a lock structure.

As illustrated in FIGS. 3 and 4, the handle unit 13 functions as a handle when the cover body 11 rolled up in the roll-up device 12 is pulled out and spread. The handle unit 13 includes a handle base 131, a handle 132, and handle-side lock portions 133.

The handle base 131 has a substantially T shape formed by a large-width portion 131a and a small-width portion 131b.

The large-width portion 131a is provided in the distal end portion of the cover body 11 and the width dimension of the large-width portion 131a is set to be equivalent to the width dimension of the cover body 11. Moreover, the large-width portion 131a supports the distal end portion of the cover body 11 such that the distal end portion is held between parts of the large-width portion 131a over the entire width of the cover body 11.

The width dimension of the small-width portion 131b is set to be smaller than that of the large-width portion 131a. Moreover, the handle 132 is arranged on an upper surface of the small-width portion 131b and the handle-side lock portions 133 are provided in both end portions of the small-width portion 131b.

The handle 132 includes paired handle legs 132a standing up from the front and rear end portions of the small-width portion 131b and a grip portion 132b connecting upper end portions of the handle legs 132a to each other while extending parallel to the handle base 131. The handle 132 has a frame-like substantially trapezoidal shape formed by the handle legs 132a and the grip portion 132b.

The handle-side lock portions 133 constitute the lock structure ST2 and are formed of substantially cylindrical protrusions protruding from both ends of the small-width portion 131b to extend along a longitudinal direction of the handle base 131.

Figure 5:
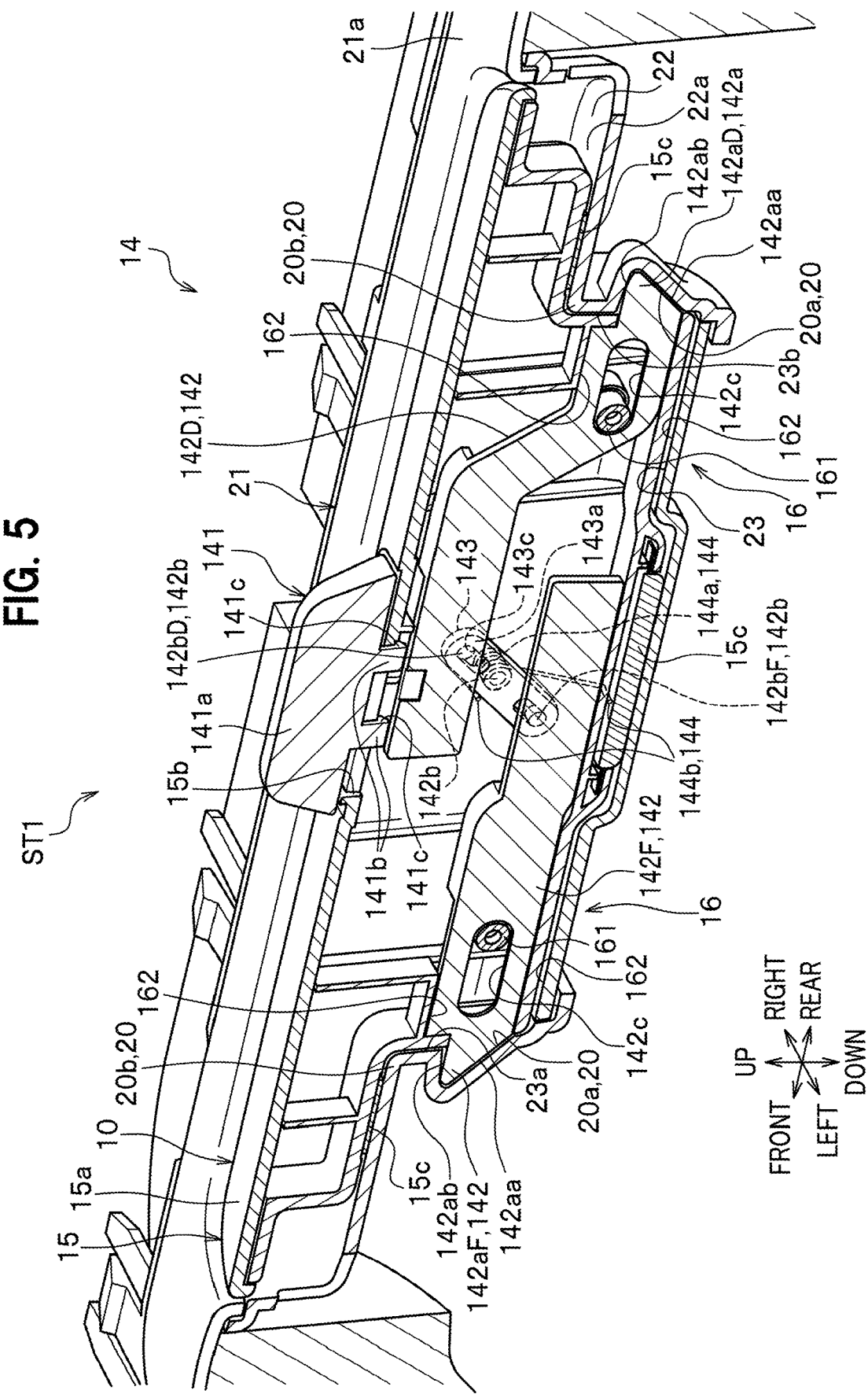
FIG. 5 is a cross-sectional perspective view of the device main body illustrating a configuration of an attachment structure.

As illustrated in FIGS. 2 and 5, the main body-side attachment unit 14 constitutes the attachment structure ST1 together with vehicle body-side attachment portions 20 and detachably attaches the device main body 10 to the vehicle body (vehicle body-side attachment portion 20). Moreover, the main body-side attachment unit 14 includes an operation lever 141, sliders 142, a link 143, and a torsion coil spring 144 (link biasing unit).

The operation lever 141 is arranged to be slidable on a top plate 15a of the main body case 15. Moreover, the operation lever 141 includes an operation portion 141a and lever legs 141b.

The operation portion 141a is a portion operated by an operator when the device main body 10 is to be removed from the vehicle body (vehicle body-side attachment portion 20), and has a substantially truncated quadrilateral pyramid shape.

The lever legs 141b are elastic plate-shaped members extending downward from a lower surface of the operation portion 141a and include triangular protrusions 141c at their distal ends. Moreover, the lever legs 141b are inserted and fitted into a lever hole 15b which is an elongated hole opened in the top plate 15a of the main body case 15 and extending along the longitudinal direction of the main body case 15.

When the lever legs 141b are inserted into the lever hole 15b, the lever legs 141b warp and the triangular protrusions 141c pass through the lever hole 15b by riding over a hole edge of the lever hole 15b. Then, the lever legs 141b elastically recover and the triangular protrusions 141c having passed through the lever hole 15b thereby engage with the hole edge of the lever hole 15b. This prevents disengagement of the operation lever 141 from the lever hole 15b while allowing the operation lever 141 to move in the longitudinal direction in the lever hole 15b.

The sliders 142 include a directly-driven slider 142D and a following slider 142F. The directly-driven slider 142D and the following slider 142F each include a slider engagement portion 142a, a link protrusion 142b, and an elongated guide hole 142c.

The slider engagement portion 142a is formed in a distal end portion of each slider 142. Moreover, the slider engagement portion 142a has a tapered shape with an acute angle formed by a tilted surface 142aa obliquely tilted with respect to an attachment direction (vertical direction) and an engagement surface 142ab orthogonal to the attachment direction.

The link protrusion 142b is formed in a base end portion of each slider 142 and is formed of a cylindrical protrusion which can be linked to the link 143.

The elongated guide hole 142c is described together with guide unit 16 to be described later.

Note that the directly-driven slider 142D is linked to the operation lever 141 via a not-illustrated link structure and is moved between an engagement position and a release position in conjunction with a sliding operation performed on the operation lever 141.

The engagement position is a position where the slider engagement portion 142a protruding from the main body case 15 can engage with a lever receiving hole 20a to be described later.

The release position is a position where the slider engagement portion 142a is housed in the main body case 15 and cannot engage with the lever receiving hole 20a.

The link 143 includes a link main body 143a, a link shaft 143b, and link holes 143c.

The link main body 143a is formed of a rectangular plate member.

The link shaft 143b is formed of a cylindrical shaft member standing perpendicular to a plate surface in a center portion of the link main body 143a and is turnably supported on the main body case 15.

The link holes 143c are paired elongated holes provided on both sides of the link shaft 143b to penetrate the plate surface and extend along the longitudinal direction of the link main body 143a. The link protrusions 142b of the sliders 142 are inserted respectively into the link holes 143c.

The link 143 converts a turning motion of the link 143 about the link shaft 143b into a linear motion of the sliders 142 by means of linkage between the link holes 143c and the link protrusions 142b.

The torsion coil spring 144 includes a coil portion 144a which is a linear spring member wound in a cylindrical shape and paired arms 144b extending from both ends of the coil portion 144a.

The coil portion 144a is wound around the link shaft 143b supporting the link 143.

One of the paired arms 144b engages with a peripheral wall of the link main body 143a and the other one engages with the main body case 15.

The torsion coil spring 144 keeps the link 143 biased to turn from the release position side toward the engagement position side (clockwise in FIG. 5). Then, the link 143 biases the operation lever 141 and both sliders 142 from the release position side toward the engagement position side. Specifically, the torsion coil spring 144 biases both sliders 142 in such directions that the sliders 142 protrude out from the main body case 15.

The guide unit 16 is a configuration for guiding the sliders 142 such that the sliders 142 slide smoothly between the engagement position and the release position without being caught. The guide unit 16 includes guide pins 161, the elongated guide holes 142c, and guide walls 162.

The elongated guide holes 142c are elongated holes penetrating the plate surfaces of the sliders 142 and define movement ranges (strokes) of the sliders 142.

The guide pins 161 stand from the main body case 15 to extend orthogonal to the slide direction, through the elongated guide holes 142c.

The guide walls 162 come into contact with upper and lower edges of the sliders 142 and are arranged opposite to each other while extending along the slide direction.

The main body case 15 includes a cushion member 15c on an outer bottom surface. The cushion member 15c absorbs vibration in traveling of the vehicle such that the main body case 15 does not rattle due to the vibration.

Figure 6:
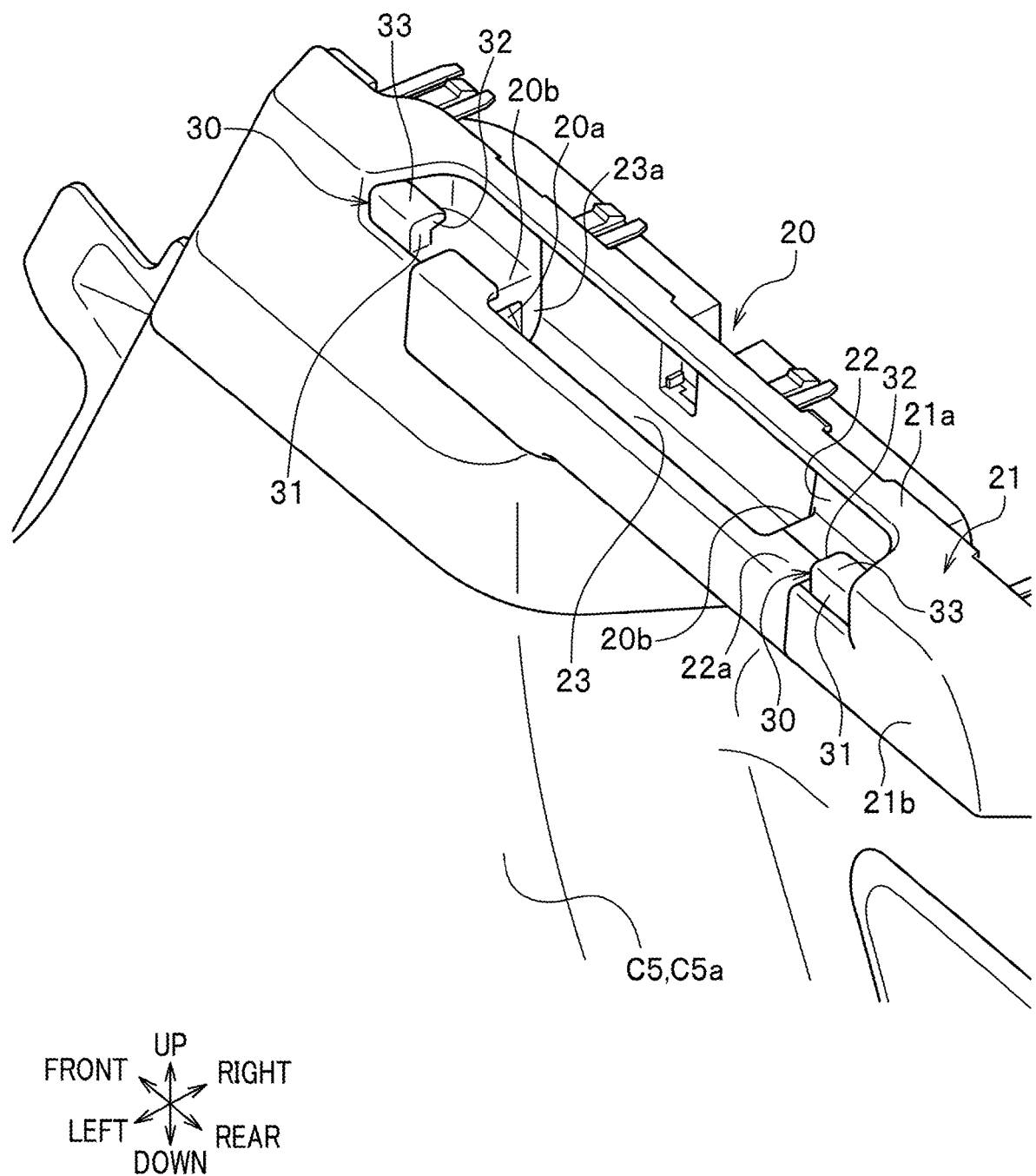
FIG. 6 is a perspective view illustrating the wall portion to which the device main body is attached in the embodiment.
Figure 7:
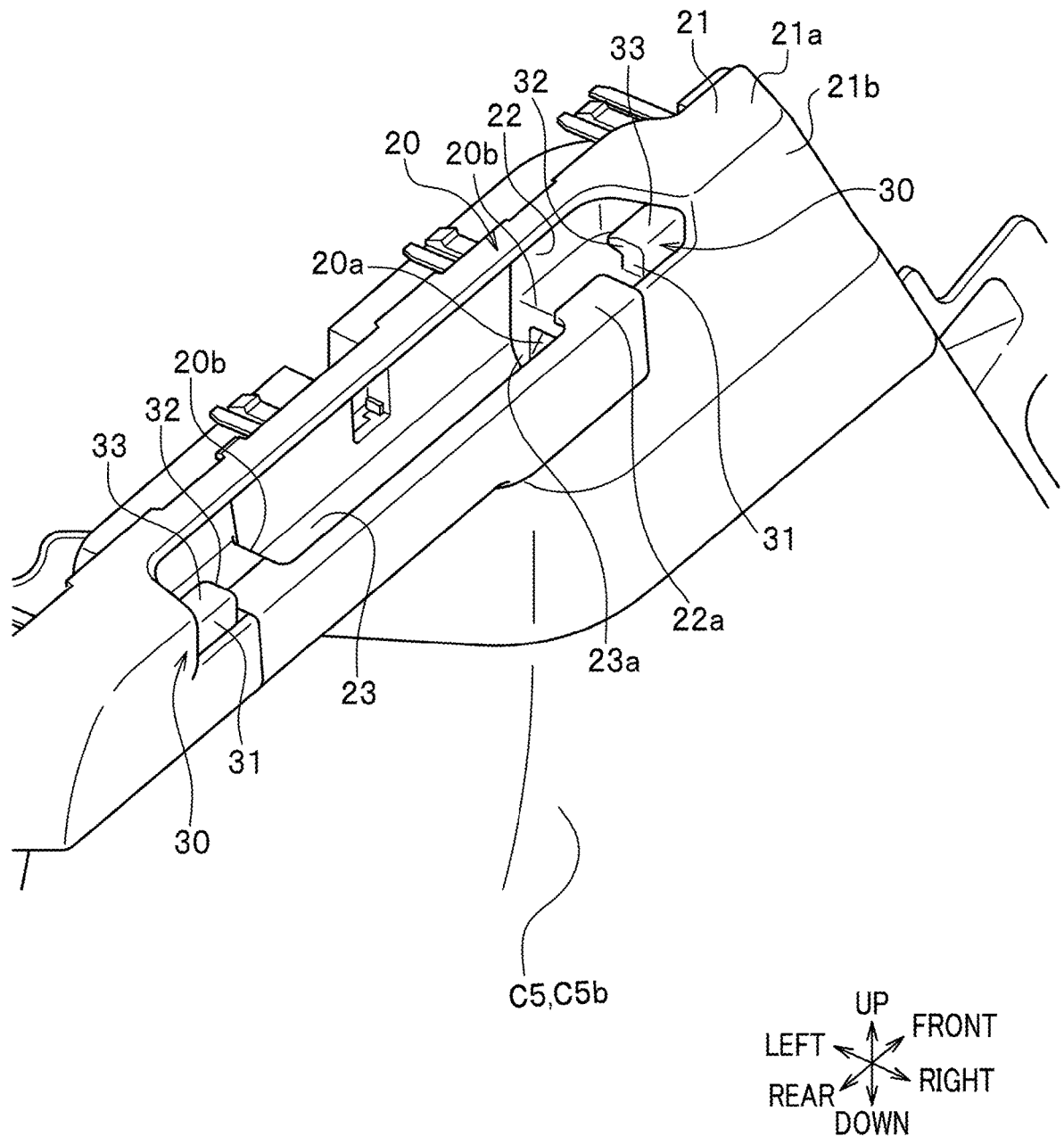
FIG. 7 is a perspective view illustrating the wall portion to which the handle unit is attached in the embodiment.

As illustrated in FIGS. 6 and 7, the vehicle body-side attachment portions 20 are vehicle body-side portions configured to receive the main body-side attachment unit 14 and are formed in wall step portions 21.

The wall step portions 21 are formed of step portions extending in the vehicle front-rear direction in the respective side walls C5 of the luggage compartment C3, at a height of the backrest of the rearmost seat C2. In a center portion of each wall step portion 21, there is formed a wall step recess portion 22 recessed with respect to a corner portion between a step portion top surface 21a and a step portion side surface 21b. Moreover, a center recess portion 23 recessed downward is formed in a bottom center portion of the wall step recess portion 22.

The vehicle body-side attachment portion 20 includes lever receiving holes 20a and center step corner portions 20b.

The lever receiving holes 20a are opened in a front wall 23a and a rear wall 23b constituting vertical walls of the center recess portion 23. The hole shape of the lever receiving holes 20a is formed in the same shape as the slider engagement portions 142a.

Each center step corner portion 20b is a corner portion between the vertical wall (front wall 23a, rear wall 23b) of the center recess portion 23 and a bottom surface 22a of the wall step recess portion 22.

Vehicle body-side lock portions 30 constituting the lock structure ST2 are formed in a bottom front end portion and a bottom rear end portion of the wall step recess portion 22. Specifically, the lock structure ST2 is formed of the vehicle body-side lock portions 30 and the aforementioned handle-side lock portions 133.

Moreover, each vehicle body-side lock portion 30 includes a lock base portion 31 and a lock arm 32.

The lock base portion 31 is formed of a protrusion standing from the bottom surface 22a of the wall step recess portion 22 toward the vehicle upper side.

The lock arm 32 is formed of a cantilever beam-shaped protrusion extending from the inside toward the outside in the vehicle width direction in a distal end portion of the lock base portion 31.

Specifically, each vehicle body-side lock portion 30 has a substantially inverted L-shape formed by the lock base portion 31 and the lock arm 32. The handle-side lock portion 133 of the handle unit 13 is locked to the inside of the L-shape.

Moreover, a receiving surface 33 is set on a top surface of the lock arm 32. The receiving surface 33 is configured to support the main body case 15 when the device main body 10 is attached to the wall step recess portion 22.

Specifically, the vehicle body-side attachment portion 20 includes the receiving surfaces 33 which support the roll-up device 12 by coming into contact therewith and the vehicle body-side lock portions 30 are formed on the back side of the receiving surfaces 33.

Moreover, the vehicle body-side lock portions 30 are formed in a portion (wall step recess portion 22) where the vehicle body-side attachment portion 20 is arranged.

Note that, in the embodiment, as illustrated in FIGS. 1 to 5, illustration is given only of the arrangement in which the main body case 15 is installed on the right side wall of the vehicle C and the cover body 11 is spread out from the right side wall to the left side wall of the vehicle C.

As illustrated in FIGS. 6 and 7, the vehicle body-side attachment portion 20 and the vehicle body-side lock portions 30 have the same configurations in the left and right wall portions C5a, C5b. Moreover, the main body-side attachment unit 14 can be detachably attached to either of the left or right vehicle body-side attachment portion 20 and the handle unit 13 can be locked to and unlocked from either of the left or right vehicle body-side lock portions 30.

In other words, although the illustration is omitted, it is possible to install the main body case 15 on the left side wall and spread out the cover body 11 toward the right side wall.

Next, operations of the attachment structure ST1 are described.

<Attached State>

As illustrated in FIG. 5, in the state where the main body case 15 is attached to the vehicle body, the link 143 is biased in a direction in which the link 143 is turned clockwise in FIG. 5 by biasing force of the torsion coil spring 144. Moreover, the biasing force applied to the link 143 acts on both sliders 142 via the link protrusions 142b. Furthermore, both sliders 142 are kept biased from the release position side to the engagement position by the biasing force.

The slider engagement portions 142a of the respective sliders 142 are thereby kept protruding from the main body case 15. The protruding slider engagement portions 142a are inserted and fitted in the lever receiving holes 20a and the device main body 10 is fixed in a state housed in the wall step recess portion 22.

<Case of Removing Main Body Case 15>

When the operation lever 141 is made to slide against the biasing force of the torsion coil spring 144, the directly-driven slider 142D slides together with the operation lever 141. Then, when the directly-driven slider 142D slides, a directly-driven engagement portion 142aD which is the slider engagement portion 142a of the directly-driven slider 142D moves out from the lever receiving hole 20a and the engagement between the directly-driven engagement portion 142aD and the lever receiving hole 20a is canceled.

Moreover, when the directly-driven slider 142D slides, the link 143 turns by means of the linkage between a directly-driven link protrusion 142bD and the link hole 143c. When the link 143 turns, the following slider 142F slides by means of the linkage between the link hole 143c and a following link protrusion 142bF.

When the following slider 142F slides, a following engagement portion 142aF which is the slider engagement portion 142a of the following slider 142F moves out from the lever receiving hole 20a and the engagement is canceled. Then, the moving-out of the directly-driven engagement portion 142aD and the following engagement portion 142aF from the lever receiving holes 20a and the canceling of the engagement between the following engagement portion 142aF and the lever receiving hole 20a allow the main body case 15 to be released and removed.

Moreover, when the operator removes his/her hand from the operation lever 141, the link 143 is turned by the basing force of the torsion coil spring 144 and the operation lever 141 and the sliders 142 are moved to the positions before the start of operation (engagement position) and are kept biased.

<Case of Attaching Main Body Case 15>

When the device main body 10 is aligned with one of the left and right wall step recess portions 22 to start a fitting operation, the tilted surfaces 142aa of the slider engagement portions 142a protruding from the main body case 15 come into contact with the center step corner portions 20b.

When the device main body 10 is further pushed into the wall step recess portion 22, the pushing force exceeds the basing force of the torsion coil spring 144 and the slider engagement portions 142a are made to retreat into the main body case 15 and are moved toward the release positions by component force in the sliding directions of the respective sliders 142 generated by the tilted surfaces 142aa. When the slider engagement portions 142a retreat into the main body case 15, nothing hinders the fitting and the device main body 10 is set to a state where the device main body 10 can be inserted into the wall step recess portion 22.

Moreover, in such a state, although the slider engagement portions 142a are retreated into the main body case 15, the distal ends of the slider engagement portions 142a are pressed against the vertical walls (front wall 23a, rear wall 23b) by the biasing force of the torsion coil spring 144.

Then, when the device main body 10 is fitted deeper and reaches the bottom of the wall step recess portion 22, the contact between the slider engagement portions 142a and the vertical walls (front wall 23a, rear wall 23b) is canceled, since the lever receiving holes 20a are opened in the vertical walls (front wall 23a, rear wall 23b). Accordingly, the sliders 142 are made to jump out from the main body case 15 and move to the engagement positions by the biasing force of the torsion coil spring 144 and the slider engagement portions 142a are inserted into the lever receiving holes 20a. Then, the engagement surfaces 142ab of the slider engagement portions 142a engage with the lever receiving holes 20a in a detachment direction and the device main body 10 is fixed to the vehicle body-side attachment portion 20.

Next, operations and effects of the tonneau cover 1 for the vehicle according to the embodiment are described.

In the tonneau cover 1 for the vehicle in the embodiment, the vehicle body-side attachment portion 20 and the vehicle body-side lock portion 30 are arranged on each of the left and right side walls C5 (paired wall portions) arranged opposite to each other as the wall surfaces forming the luggage compartment C3.

The roll-up device 12 can be thereby detachably attached to either one of the left or right side wall C5. Moreover, the handle 132 (handle unit 13) can be locked to and unlocked from the other wall portion C5b opposite to the one wall portion C5a to which the roll-up device 12 is attached.

Since the cover body 11 can be pulled out and spread from either of the left or right side wall C5, the convenience can be improved.

Moreover, in the tonneau cover 1 for the vehicle in the embodiment, the vehicle body-side lock portions 30 are formed in the wall step recess portions 22 which are portions in which the vehicle body-side attachment portions 20 are arranged.

The tonneau cover 1 for the vehicle with excellent convenience can be thereby installed in a smaller installation space.

Moreover, in the tonneau cover 1 for the vehicle in the embodiment, the vehicle body-side attachment portions 20 include the receiving surfaces 33 which come into contact with the device main body 10 including the roll-up device 12 to support it, and the vehicle body-side lock portions 30 are formed on the back side of the receiving surfaces 33.

The tonneau cover 1 for the vehicle with excellent convenience can be thereby stably installed without an increase in the installation space.

Note that, although the tonneau cover 1 for the vehicle in the embodiment has such a configuration that the operation lever 141 turns the link 143 and causes both sliders 142 to slide, the present invention is not limited to this configuration.

For example, the configuration may be such that both arms 144b of the torsion coil spring 144 are linked to the respective sliders 142 without the link 143 therebetween and the biasing force of the torsion coil spring 144 is directly applied to the sliders 142.

Moreover, although the tonneau cover 1 for the vehicle in the embodiment has such a configuration that the operation portion 141a, the sliders 142, and the link 143 are arranged in the main body case 15 and the slider engagement portions 142a are inserted and fitted into the lever receiving holes 20a on the vehicle side, the present invention is not limited to this configuration.

For example, the configuration may be such that the lever receiving holes are provided in the main body case and the operation lever, the sliders, and the link are arranged on the vehicle body side (wall step recess portions).

In other words, any configuration can be employed as long as the configuration is such that the main body case 15 can be detachably attached to the vehicle body.

Furthermore, although the tonneau cover 1 for the vehicle in the embodiment has such a configuration that the columnar handle-side lock portions 133 are locked by being hooked to the vehicle body-side lock portions 30 with the inverted L shape, the present invention is not limited to this configuration.

For example, the configuration may be such that the handle-side lock portions 133 have a claw shape and are locked by being hooked to protrusions or recesses provided as the vehicle body-side lock portions 30.

In other words, any configuration can be employed as long as the configuration is such that the handle 132 can be locked to and unlocked from the vehicle body.

REFERENCE SIGNS LIST 1 tonneau cover for vehicle
11 cover body 12 roll-up device
13 handle unit
20 vehicle body-side attachment portion
30 vehicle body-side lock portion
33 receiving surface
C3 luggage compartment
C5 paired wall portion
C5a one wall portion
C5b other wall portion

The invention claimed is:

1. A tonneau cover for a vehicle including:
a sheet-like flexible cover body;
a roll-up device configured to roll up the cover body while supporting one end of the cover body; and
a handle unit arranged at another end of the cover body and configured to serve as a handle when the cover body is pulled out from the roll-up device,
wherein
the roll-up device is configured to be detachably attachable to either one of paired wall portions arranged opposite to each other as wall surfaces forming a luggage compartment of the vehicle,
the handle unit is capable of being locked to and unlocked from the other wall portion opposite to the one wall portion to which the roll-up device is attached,
the roll-up device is detachably attached to either one of left and right vehicle body-side attachment portions arranged in the respective paired wall portions,
the handle unit is capable of being locked to and unlocked from either of left and right vehicle body-side lock portions formed in sections of the respective paired wall portions, and
after the roll-up device is detached from either one of the left and right vehicle body-side attachment portions to which the roll-up device has been attached, the roll-up device is attached to the other one of the left and right vehicle body-side attachment portions so that a roll up direction of the cover body is made to be reversed.

2. The tonneau cover for the vehicle according to claim 1, wherein
the vehicle body-side lock portions are formed in sections where the vehicle body-side attachment portions are arranged.

3. The tonneau cover for the vehicle according to claim 2, wherein the vehicle body-side attachment portions include receiving surfaces configured to come into contact with the roll-up device and support the roll-up device, and
the vehicle body-side lock portions are formed on the back sides of the receiving surfaces.

4. A tonneau cover for a vehicle including:
a sheet-like flexible cover body;
a roll-up device configured to roll up the cover body while supporting one end of the cover body; and
a handle unit arranged at another end of the cover body and configured to serve as a handle when the cover body is pulled out from the roll-up device,
wherein
the roll-up device is configured to be detachably attachable to either one of paired wall portions arranged opposite to each other as wall surfaces forming a luggage compartment of the vehicle,
the handle unit is capable of being locked to and unlocked from the other wall portion opposite to the one wall portion to which the roll-up device is attached,
the roll-up device is detachably attached to either one of left and right vehicle body-side attachment portions arranged in the respective paired wall portions,
the handle unit is capable of being locked to and unlocked from either of left and right vehicle body-side lock portions formed in sections of the respective paired wall portions, and
the left and right vehicle body-side attachment portions have same configurations and the left and right vehicle body-side lock portions have same configurations.

* * * * *